US012726685B2

(12) United States Patent
Wang et al.

(10) Patent No.: US 12,726,685 B2
(45) Date of Patent: Sep. 1, 2026

(54) VIDEO GENERATION BASED ON 3D WINDOW ATTENTION

(71) Applicants: Lemon Inc., Grand Cayman (KY); Beijing Zitiao Network Technology Co., Ltd., Beijing (CN)

(72) Inventors: Jianyi Wang, Singapore (SG); Zhijie Lin, Singapore (SG); Meng Wei, Beijing (CN); Yang Zhao, Singapore (SG); Lu Jiang, Los Angeles, CA (US)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/874,513

(22) PCT Filed: Dec. 11, 2024

(86) PCT No.: PCT/CN2024/138636
§ 371 (c)(1),
(2) Date: Dec. 12, 2024

(87) PCT Pub. No.: WO2025/138636
PCT Pub. Date: Jul. 3, 2025

(65) Prior Publication Data

US 2026/0164094 A1 Jun. 11, 2026

(30) Foreign Application Priority Data

Dec. 28, 2023 (CN) ........................ 202311840365.0

(51) Int. Cl.
*H04N 21/81* (2011.01)

(52) U.S. Cl.
CPC ................................ *H04N 21/816* (2013.01)

(58) Field of Classification Search
CPC .................................................. H04N 21/816
See application file for complete search history.

(56) References Cited

U.S. PATENT DOCUMENTS

2022/0301311 A1 9/2022 Abati et al.
2023/0130006 A1* 4/2023 He ...................... G06N 3/0464 382/159
2026/0024336 A1* 1/2026 Gorti ...................... G06V 20/41

FOREIGN PATENT DOCUMENTS

CN 114841867 A 8/2022
CN 117830099 A 4/2024
(Continued)

OTHER PUBLICATIONS

English translation of CN 117830099 B Oct. 18, 2024 (Year: 2024).*

(Continued)

*Primary Examiner* — Gigi L Dubasky
(74) *Attorney, Agent, or Firm* — Alleman Hall LLP

(57) ABSTRACT

Embodiments of the present disclosure provide a solution for video generation. The method comprises: determining a video feature of an input video and a text feature of an input text; dividing the video feature into a plurality of 3D video windows based on a predetermined window size, the plurality of 3D video windows comprising a first video window and a second video window; updating the video feature by determining video attention within each video window of the plurality of 3D video windows, wherein the video attention associated with the first video window is independent from the second video window; and generating a target video based on the updated video feature.

16 Claims, 5 Drawing Sheets

(56) References Cited

FOREIGN PATENT DOCUMENTS

| | | | | | |
|---|---|---|---|---|---|
| CN | 118035495 | A | * | 5/2024 | ............... G06N 3/08 |
| CN | 118212328 | A | | 6/2024 | |
| CN | 117830099 | B | * | 10/2024 | ............ G06N 3/047 |
| CN | 115391511 | B | * | 5/2025 | ............ G10L 15/26 |
| WO | 2024005784 | A1 | | 1/2024 | |

OTHER PUBLICATIONS

English translation version of CN 118035495 A May 14, 2024 (Year: 2024).*

English translation version of CN 115391511 B May 27, 2025 (Year: 2025).*

ISA China National Intellectual Property Administration, International Search Report Issued in Application No. PCT/CN2024/138636, Sep. 2, 2025, WIPO, 3 pages.

* cited by examiner

VIDEO GENERATION BASED ON 3D WINDOW ATTENTION

FIELD

The disclosed example embodiments relate generally to the field of computer science, particularly to a method, device, and storage medium for video generation.

BACKGROUND

Video restoration poses non-trivial challenges in maintaining fidelity while recovering temporally consistent details from unknown degradations in the wild.

In recent years, there is a growing demand for video restoration techniques that can effectively handle videos of arbitrary lengths and resolutions, while maintaining temporal consistency and spatial detail.

SUMMARY

In a first aspect of the present disclosure, there is provided a method for video generation. The method comprises: dividing a video feature of an input video into a plurality of 3D video windows based on a predetermined window size, the plurality of 3D video windows comprising a first video window and a second video window; updating the video feature by determining video attention within each video window of the plurality of 3D video windows, wherein the video attention associated with the first video window is independent from the second video window; and generating a target video based on the updated video feature.

In a second aspect of the present disclosure, there is provided an electronic device. The device comprises at least one processing unit; and at least one memory coupled to the at least one processing unit and storing instructions executable by the at least one processing unit, the instructions, upon execution by the at least one processing unit, causing the electronic device to perform actions comprising: dividing a video feature of an input video into a plurality of 3D video windows based on a predetermined window size, the plurality of 3D video windows comprising a first video window and a second video window; updating the video feature by determining video attention within each video window of the plurality of 3D video windows, wherein the video attention associated with the first video window is independent from the second video window; and generating a target video based on the updated video feature.

In a third aspect of the present disclosure, a non-transitory computer-readable storage medium is provided. The non-transitory computer-readable storage medium has a computer program stored thereon which, upon execution by an electronic device, causes the device to perform actions comprising: dividing a video feature of an input video into a plurality of 3D video windows based on a predetermined window size, the plurality of 3D video windows comprising a first video window and a second video window; updating the video feature by determining video attention within each video window of the plurality of 3D video windows, wherein the video attention associated with the first video window is independent from the second video window; and generating a target video based on the updated video feature.

It would be appreciated that the content described in the Summary section of the present invention is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where.

DETAILED DESCRIPTION

Figure 1:
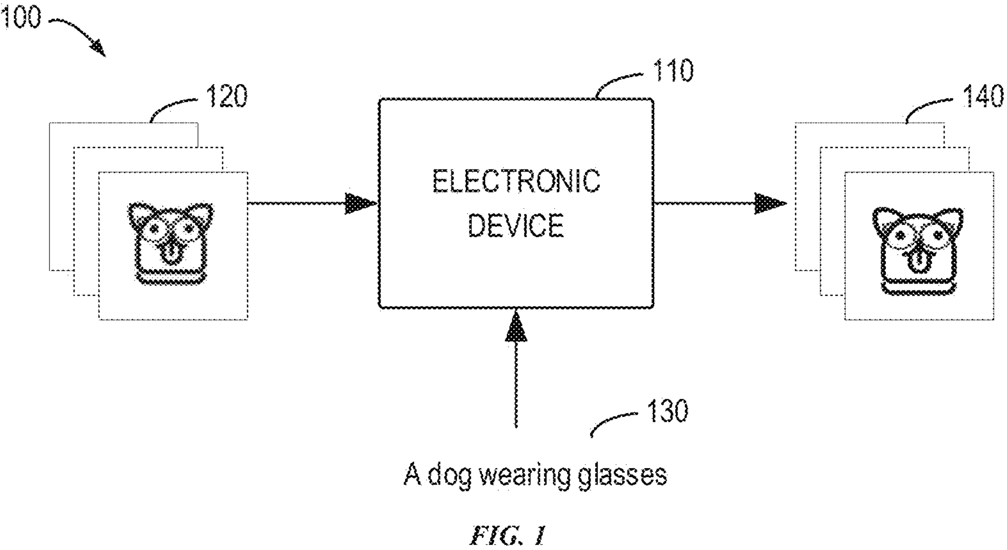
FIG. 1 illustrates a schematic diagram of an example environment in which embodiments of the present disclosure may be implemented.

The embodiments of the present disclosure will be described in more detail below with reference to the accompanying drawings. Although some embodiments of the present disclosure are shown in the drawings, it would be appreciated that the present disclosure may be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for the purpose of illustration and are not intended to limit the scope of protection of the present disclosure.

In the description of the embodiments of the present disclosure, the term "including" and similar terms would be appreciated as open inclusion, that is, "including but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below. As used herein, the term "model" can represent the matching degree between various data. For example, the above matching degree can be obtained based on various technical solutions currently available and/or to be developed in the future.

It will be appreciated that the data involved in this technical proposal (including but not limited to the data itself, data acquisition or use) shall comply with the requirements of corresponding laws, regulations and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, and the user's authorization should be obtained.

For example, in response to receiving an active request from a user, a prompt message is sent to the user to explicitly prompt the user that the operation requested operation by the user will need to obtain and use the user's personal information. Thus, users may select whether to provide personal information to the software or the hardware such as an electronic device, an application, a server or a storage medium that perform the operation of the technical solution of the present disclosure according to the prompt information.

As an optional but non-restrictive implementation, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

Traditional video restoration methods often struggle with the trade-off between computational efficiency and output quality, especially when dealing with high-resolution and long-duration videos.

According to embodiments of the present disclosure, a video feature of an input video is divided into a plurality of 3D video windows based on a predetermined window size, the plurality of 3D video windows comprising a first video window and a second video window. Further, the video feature is updated by determining video attention within each video window of the plurality of 3D video windows, wherein the video attention associated with the first video window is independent from the second video window. Additionally, a target video is generated based on the updated video feature.

In this way, the embodiments of the present disclosure may overcome the resolution constraints of traditional window attention, thereby enabling handling inputs with arbitrary resolutions effectively.

FIG. 1 illustrates a schematic diagram of an example environment 100 in which embodiments of the present disclosure can be implemented. In the example environment 100 of FIG. 1, an electronic device 110 may obtain an input video 120. For example, the input video 120 may comprise a user input video for video restoration.

Further, the electronic device 110 may further obtain a text associated with the input video 120. For example, the text 130 may comprise a caption of the input video 120. As an example, the text 130 may be generated using a caption generation model based on the input video 120. In another example, the text 130 may also be input by a user, e.g., a user prompt.

As will be discussed below, the electronic device 110 may generate a target video 140 based on the input video 120 and the text 130. In some embodiments, a first image quality of the target video 130 is better than a second image quality of the input video 120. For example, a resolution of the target video 140 is greater than the input video 120.

The video generation method will be discussed in detail with reference to FIG. 2 below.

In some embodiments, the electronic device 110 may be any type of mobile terminal, fixed terminal, or portable terminal, including a mobile phone, a desktop computer, a laptop, a notebook, a netbook, a tablet, a media computer, a multimedia tablet, a personal communication system (PCS) device, a personal navigation device, a personal digital assistant (PDA), an audio/video player, a digital camera/video camera, positioning device, television receiver, radio broadcast receiver, e-book device, gaming device, or any combination of the foregoing, including accessories and peripherals for these devices or any combination thereof. In some embodiments, the electronic device 110 can also support any type of user-specific interface (such as "wearable" circuitry). The electronic device 110 can also be various types of computing systems/servers capable of providing computing capability, including but not limited to, a mainframe, an edge computing node, a computing device in cloud environment, and the like.

It should be understood that the structure and function of each element in the environment 100 is described for illustrative purposes only and does not imply any limitations on the scope of the present disclosure.

Some example embodiments of the present disclosure will continue to be described below with reference to the accompanying drawings.

Figure 2:
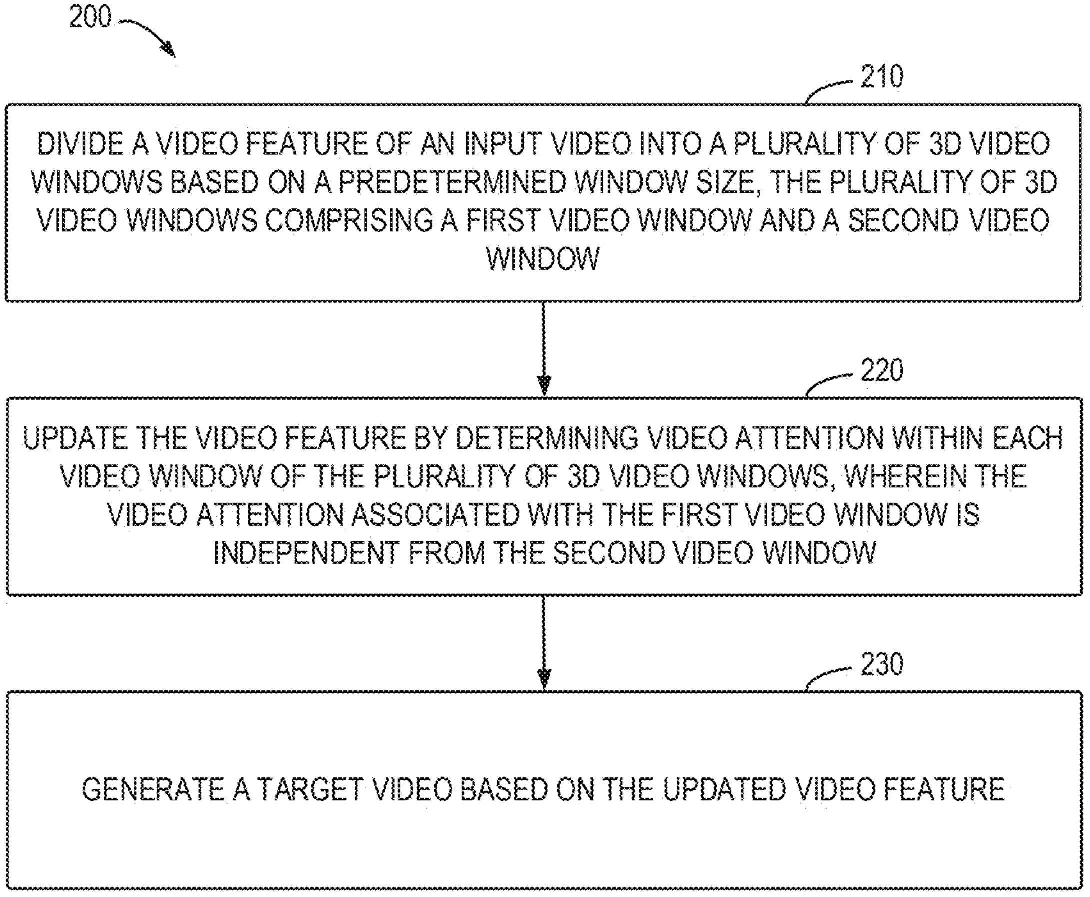
FIG. 2 illustrates a flow chart of a process for video generation in accordance with some embodiments of the present disclosure.

FIG. 2 illustrates a flow chart of a process 200 for video generation in accordance with some embodiments of the present disclosure. The process 200 can be implemented at the electronic device 110 as shown in FIG. 1.

As shown in FIG. 2, at block 210, the electronic device 110 divides a video feature of an input video into a plurality of 3D video windows based on a predetermined window size, the plurality of 3D video windows comprising a first video window and a second video window.

Figure 3A:
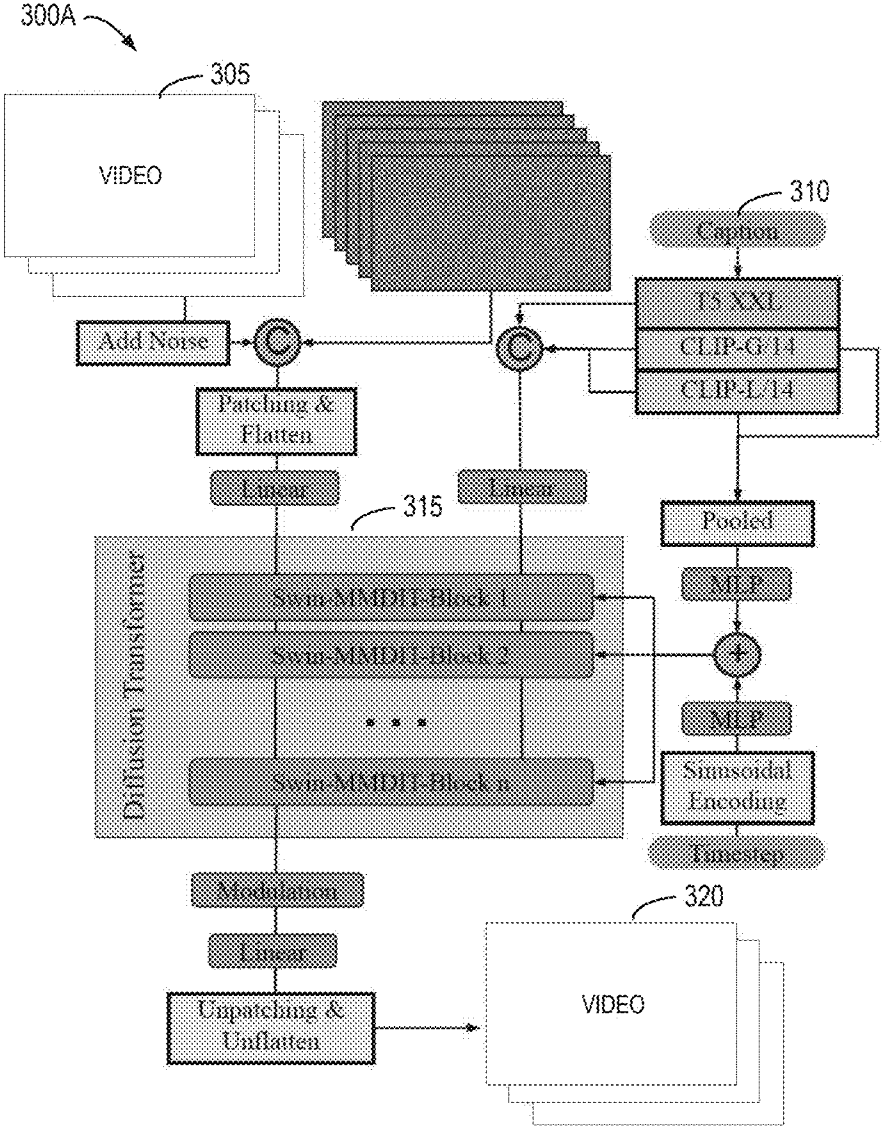
FIG. 3A illustrates an example model structure in accordance with some embodiments of the present disclosure.

FIG. 3A illustrates an example model structure 300A in accordance with some embodiments of the present disclosure.

As shown in FIG. 3A, the electronic device 110 may apply a pretrained autoencoder applied to compress the input video into latent space, thereby obtaining a video feature of the input video 305. Similarly, the text 310 (e.g., caption of the input video 305) maybe encoded by three pretrained text encoders.

As shown in FIG. 3A, the model structure 300A comprises a diffusion transformer (DiT) 315, which further comprises a plurality of DiT blocks.

Figure 3B:
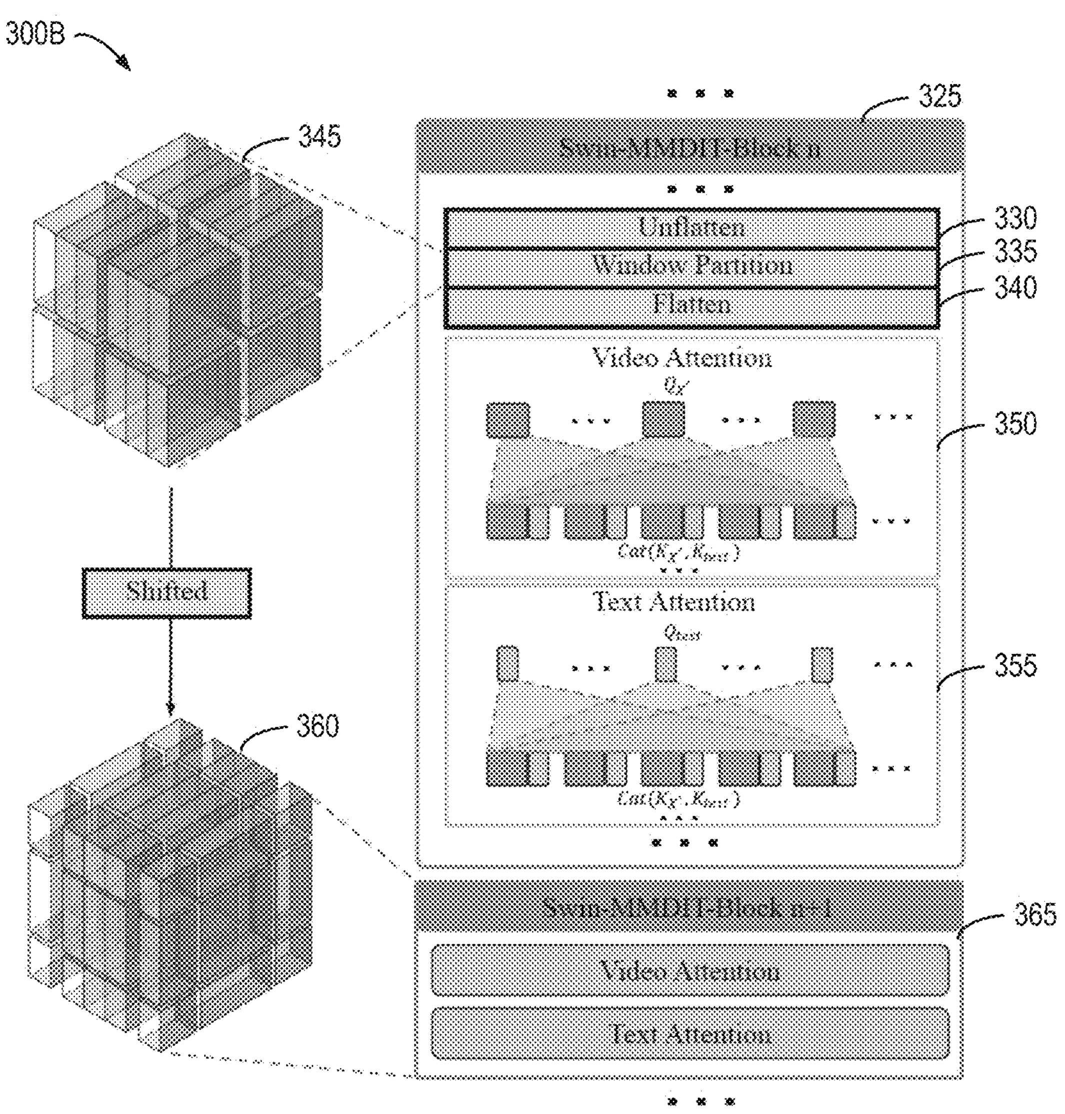
FIG. 3B illustrates an example diffusion transformer block in accordance with some embodiments of the present disclosure.

FIG. 3B illustrates an example diffusion transformer block in accordance with some embodiments of the present disclosure.

As shown in FIG. 3B, a diffusion transformer block 325 may comprise an unflatten unit 330, a window partition unit 335, a flatten unit 340, a video attention unit 350 and a text attention unit 355.

As shown, the window partition unit 335 may divide a video feature of an input video into a plurality of 3D video windows 345 based on a predetermined window size.

For example, the video feature $X \in \mathbb{R}^{T \times H \times W \times d}$ can be divided into $$\left(\frac{T}{t}+1\right)\times\left(\frac{H}{h}+1\right)\times\left(\frac{W}{w}+1\right)$$

windows, and the predetermined 3D window size is t×h×w, wherein t denotes a length of time, h denotes a height of the window, and w denotes a width of the window.

In some embodiments, the predetermined window size may be independent from a size of the input video. It is unnecessary to make the window size divisible by the feature map size. For example, the plurality of 3D video windows 345 may comprise at least one window whose size is smaller than the predetermined window size.

Further, the flatten unit 340 may determine the 3D window features of the plurality of 3D video windows 345, and may convert the 3D window features into 2D tensors. For example, the flatten unit 340 may flatten the partitioned window features into a concatenated 2D tensor.

At block 220, the electronic device 110 updates the video feature by determining video attention within each video window of the plurality of 3D video windows, wherein the video attention associated with the first video window is independent from the second video window.

As shown in FIG. 3B, the video attention unit 350 may determine the video attention of the 3D video window based on the concatenated 2D tensor.

For example, the video attention unit 350 may determine a set of query vectors $Q_{X'}$, a first set of key vectors $K_{X'}$ and a first set of value vectors $V_{X'}$ based on the 2D tensor.

Further, the video attention unit 350 may concatenate the first set of key vectors $K_{X'}$ with a second set of key vectors $K_{text}$ to obtain an updated set of key vectors, and concatenating the first set of value vectors $V_{X'}$ with a second set of value vectors $V_{text}$ to obtain an updated set of value vectors.

In some embodiments, the second set of key vectors $K_{text}$ and the second set of value vectors $V_{text}$ are determined based on a text 310 associated with the input video 305. For example, the second set of key vectors $K_{text}$ and the second set of value vectors $V_{text}$ may be determined based on the text feature of the text 310, e.g., caption.

As shown, the video attention may be determined within each video window 345, and a video attention of a video window is independent from a different video window.

Similarly, the text attention unit 355 may determine the text attention based on the text feature and video feature. For example, the text attention unit 355 may determine the text attention based on a set of text query vectors $Q_{text}$, the concatenated key vectors Cat ($K_{X'}$, $K_{text}$), and the concatenated value vectors Cat ($V_{X'}$, $V_{text}$).

As shown in FIG. 3B, the diffusion transformer (DiT) 315 may further comprise a diffusion transformer block 365, and multiple rounds of attention may be applied.

For example, after the first round of attention by the diffusion transformer block 325, the updated video feature and text feature may be provided to the diffusion transformer block 365.

Firstly, the unflatten unit in the diffusion transformer block 365 may convert the updated video feature into a 3D video feature, and the window partition unit may further divide the 3D video feature into a second plurality of video windows 360.

Different from the window partition unit 335 in the diffusion transformer block 325, the window partition unit in the diffusion transformer block 365 may divide the video feature with a shift window.

For example, a first starting position of the second plurality of 3D video windows 360 is determined based on a second starting position of the first plurality of 3D video windows 345 and an offset.

For example, the diffusion transformer block 365 may apply a shifted window attention before the video attention is determined by the video attention unit in the diffusion transformer block 365.

In some embodiment, the offset may be relevant to the predetermined window size. For example, the offset may be half of the window size, e.g., (t/2, h/2, w/2).

By using shift window mechanism, the embodiments of the present disclosure may effectively process videos with arbitrary resolutions by dividing the video into non-overlapping windows of a predetermined size. In this way, the traditional limitation of window attention mechanism may be bypassed, which often require input resolutions to be multiples of the window size.

Further, for attention determination, 3D relative rotary positional embeddings (RoPE) within each window may be used, thereby avoiding the resolution bias introduced by positional.

At block 230, the electronic device 110 generates a target video based on the updated video feature.

As shown in FIG. 3A, the target video 320 may be generated after a plurality of video window attention.

In this way, the embodiments of the present disclosure may overcome the resolution constraints of traditional window attention, thereby enabling handling inputs with arbitrary resolutions effectively.

Figure 4:
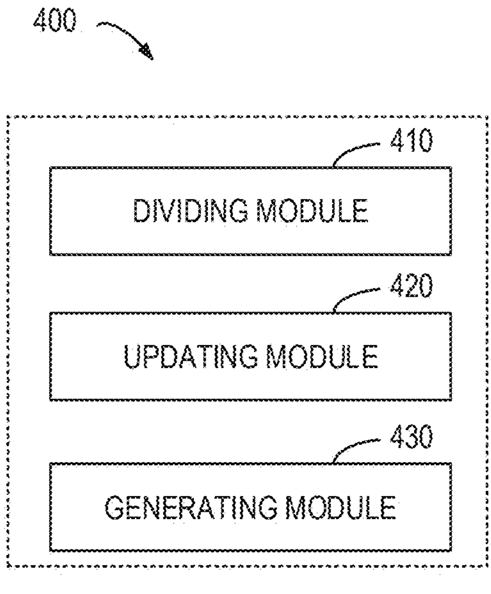
FIG. 4 illustrates a block diagram of an apparatus for video generation in accordance with some embodiments of the present disclosure.

FIG. 4 shows a block diagram of an apparatus 400 for video generation in accordance with some embodiments of the present disclosure. The apparatus 400 may be implemented, for example, or included at the electronic device 110 of FIG. 1. Various modules/components in the apparatus 400 may be implemented by hardware, software, firmware, or any combination thereof.

As shown, the apparatus 400 comprises a dividing module 410, configured for dividing a video feature of an input video into a plurality of 3D video windows based on a predetermined window size, the plurality of 3D video windows comprising a first video window and a second video window; an updating module 420, configured for updating the video feature by determining video attention within each video window of the plurality of 3D video windows, wherein the video attention associated with the first video window is independent from the second video window; and a generating module 430, configured for generating a target video based on the updated video feature.

In some embodiments, the predetermined window size is independent from a size of the input video. In some cases, the plurality of 3D video windows may comprise at least one window whose size is smaller than the predetermined window size.

In some embodiments, the apparatus 400 further comprises a determining module, configured for determining a window feature of a target 3D video window; converting the window feature into a 2D tensor; and determining the video attention of the target 3D video window based on the 2D tensor.

In some embodiments, the apparatus 400 further comprises a vector determining module, configured for determining a set of query vectors, a first set of key vectors and a first set of value vectors based on the 2D tensor; concatenating the first set of key vectors with a second set of key vectors to obtain an updated set of key vectors, and concatenating the first set of value vectors with a second set of value vectors to obtain an updated set of value vectors, wherein the second set of key vectors and the second set of value vectors are determined based on a text associated with the input video; and determining the video attention based on the set of query vectors, the updated set of key vectors and the updated set of value vectors.

In some embodiments, the text comprises an input text or a text generated based on the input video.

In some embodiments, the video attention comprises a first round of video attention, the plurality of 3D video windows comprise a first plurality of 3D video windows, and before generating a target video based on the updated video feature, the apparatus 400 further comprises a feature dividing module, configured for dividing the updated video feature a second plurality of 3D video windows based on the predetermined window size, wherein a first starting position of the second plurality of 3D video windows is determined based on a second starting position of the first plurality of 3D video windows and an offset; and updating the video feature by determining video attention within each video window of the second plurality of 3D video windows.

In some embodiments, the offset is relevant to the predetermined window size.

In some embodiments, a first image quality of the target video is better than a second image quality of the input video.

Figure 5:
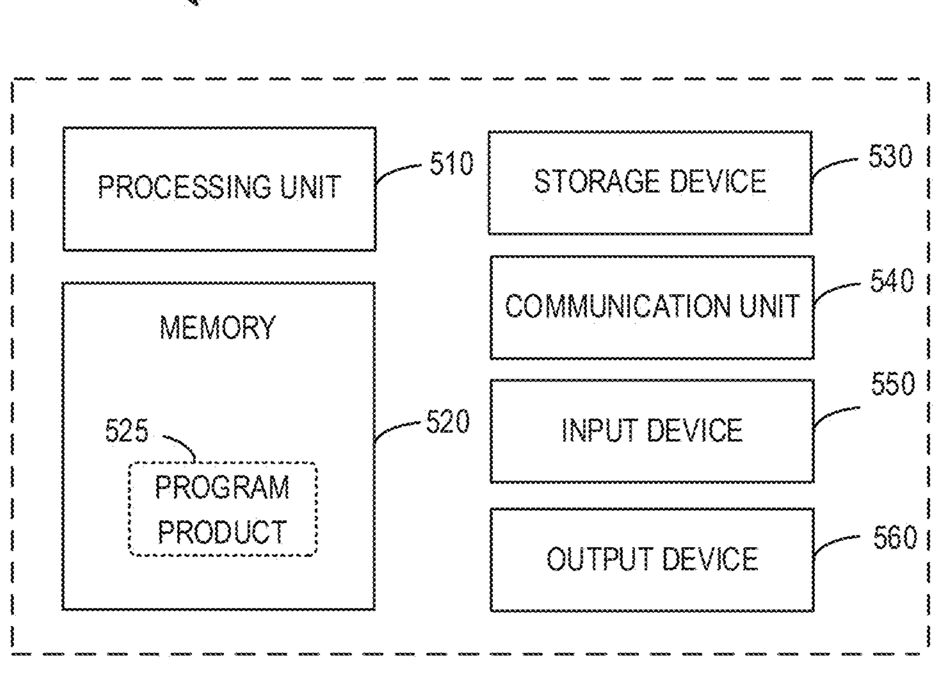
FIG. 5 illustrates a block diagram of an electronic device in which one or more embodiments of the present disclosure can be implemented.

FIG. 5 illustrates a block diagram of an electronic device 500 in which one or more embodiments of the present disclosure can be implemented. It would be appreciated that the electronic device 500 shown in FIG. 5 is only an example and should not constitute any restriction on the function and scope of the embodiments described herein. The electronic device 500 may be used, for example, to implement the electronic device 110 of FIG. 1. The electronic device 500 may also be used to implement the apparatus 400 of FIG. 4.

As shown in FIG. 5, the electronic device 500 is in the form of a general computing device. The components of the electronic device 500 may include, but are not limited to, one or more processors or processing units 510, a memory 520, a storage device 530, one or more communication units 540, one or more input devices 550, and one or more output devices 560. The processing unit 510 may be an actual or virtual processor and can execute various processes according to the programs stored in the memory 520. In a multiprocessor system, multiple processing units execute computer executable instructions in parallel to improve the parallel processing capability of the electronic device 500.

The electronic device 500 typically includes a variety of computer storage medium. Such medium may be any available medium that is accessible to the electronic device 500, including but not limited to volatile and non-volatile medium, removable and non-removable medium. The memory 520 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 530 may be any removable or non-removable medium, and may include a machine-readable medium, such as a flash drive, a disk, or any other medium, which can be used to store information and/or data (such as training data for training) and can be accessed within the electronic device 500.

The electronic device 500 may further include additional removable/non-removable, volatile/non-volatile storage medium. Although not shown in FIG. 5, a disk driver for reading from or writing to a removable, non-volatile disk (such as a “floppy disk”), and an optical disk driver for reading from or writing to a removable, non-volatile optical disk can be provided. In these cases, each driver may be connected to the bus (not shown) by one or more data medium interfaces. The memory 520 may include a computer program product 525, which has one or more program modules configured to perform various methods or acts of various embodiments of the present disclosure.

The communication unit 540 communicates with a further computing device through the communication medium. In addition, functions of components in the electronic device 500 may be implemented by a single computing cluster or multiple computing machines, which can communicate through a communication connection. Therefore, the electronic device 500 may be operated in a networking environment using a logical connection with one or more other servers, a network personal computer (PC), or another network node.

The input device 550 may be one or more input devices, such as a mouse, a keyboard, a trackball, etc. The output device 560 may be one or more output devices, such as a display, a speaker, a printer, etc. The electronic device 500 may also communicate with one or more external devices (not shown) through the communication unit 540 as required. The external device, such as a storage device, a display device, etc., communicate with one or more devices that enable users to interact with the electronic device 500, or communicate with any device (for example, a network card, a modem, etc.) that makes the electronic device 500 communicate with one or more other computing devices. Such communication may be executed via an input/output (I/O) interface (not shown).

According to example implementation of the present disclosure, a computer-readable storage medium is provided, on which a computer-executable instruction or computer program is stored, where the computer-executable instructions or the computer program is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the device, the equipment and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

What is claimed is:

1. A method for video generation, comprising:

dividing a video feature of an input video into a plurality of three-dimensional (3D) video windows based on a predetermined window size, the plurality of 3D video windows comprising a first video window and a second video window;

updating the video feature by determining video attention within each video window of the plurality of 3D video windows, wherein the video attention associated with the first video window is independent from the second video window;

generating a target video based on the updated video feature;

determining a window feature of a target 3D video window;

converting the window feature into a two-dimensional (2D) tensor;

determining a set of query vectors, a first set of key vectors, and a first set of value vectors based on the 2D tensor;

concatenating the first set of key vectors with a second set of key vectors to obtain an updated set of key vectors, and concatenating the first set of value vectors with a second set of value vectors to obtain an updated set of value vectors, wherein the second set of key vectors and the second set of value vectors are determined based on a text associated with the input video; and determining the video attention based on the set of query vectors, the updated set of key vectors, and the updated set of value vectors.

2. The method of claim 1, wherein the predetermined window size is independent from a size of the input video.

3. The method of claim 2, wherein the plurality of 3D video windows comprise at least one window whose size is smaller than the predetermined window size.

4. The method of claim 1, wherein the text comprises an input text or a text generated based on the input video.

5. The method of claim 1, wherein the video attention comprises a first round of video attention, the plurality of 3D video windows comprise a first plurality of 3D video windows, and before generating a target video based on the updated video feature, the method further comprises:

dividing the updated video feature a second plurality of 3D video windows based on the predetermined window size, wherein a first starting position of the second plurality of 3D video windows is determined based on a second starting position of the first plurality of 3D video windows and an offset; and updating the video feature by determining video attention within each video window of the second plurality of 3D video windows.

6. The method of claim 5, wherein the offset is relevant to the predetermined window size.

7. The method of claim 1, wherein a first image quality of the target video is better than a second image quality of the input video.

8. An electronic device, comprising:

at least one processing unit; and at least one memory coupled to the at least one processing unit and storing instructions executable by the at least one processing unit, the instructions, upon execution by the at least one processing unit, causing the electronic device to perform actions comprising:

dividing a video feature of an input video into a plurality of three-dimensional (3D) video windows based on a predetermined window size, the plurality of 3D video windows comprising a first video window and a second video window;

updating the video feature by determining video attention within each video window of the plurality of 3D video windows, wherein the video attention associated with the first video window is independent from the second video window;

generating a target video based on the updated video feature;

determining a window feature of a target 3D video window;

converting the window feature into a two-dimensional (2D) tensor;

determining a set of query vectors, a first set of key vectors, and a first set of value vectors based on the 2D tensor;

concatenating the first set of key vectors with a second set of key vectors to obtain an updated set of key vectors, and concatenating the first set of value vectors with a second set of value vectors to obtain an updated set of value vectors, wherein the second set of key vectors and the second set of value vectors are determined based on a text associated with the input video; and determining the video attention based on the set of query vectors, the updated set of key vectors, and the updated set of value vectors.

9. The electronic device of claim 8, wherein the predetermined window size is independent from a size of the input video.

10. The electronic device of claim 9, wherein the plurality of 3D video windows comprise at least one window whose size is smaller than the predetermined window size.

11. The electronic device of claim 8, wherein the text comprises an input text or a text generated based on the input video.

12. The electronic device of claim 8, wherein the video attention comprises a first round of video attention, the plurality of 3D video windows comprise a first plurality of 3D video windows, and before generating a target video based on the updated video feature, the actions further comprise:

dividing the updated video feature a second plurality of 3D video windows based on the predetermined window size, wherein a first starting position of the second plurality of 3D video windows is determined based on a second starting position of the first plurality of 3D video windows and an offset; and updating the video feature by determining video attention within each video window of the second plurality of 3D video windows.

13. The electronic device of claim 12, wherein the offset is relevant to the predetermined window size.

14. The electronic device of claim 8, wherein a first image quality of the target video is better than a second image quality of the input video.

15. A non-transitory computer-readable storage medium, having a computer program stored thereon which, upon execution by an electronic device, causes the device to perform actions comprising:

dividing a video feature of an input video into a plurality of three-dimensional (3D) video windows based on a predetermined window size, the plurality of 3D video windows comprising a first video window and a second video window;

updating the video feature by determining video attention within each video window of the plurality of 3D video windows, wherein the video attention associated with the first video window is independent from the second video window;

generating a target video based on the updated video feature;

determining a window feature of a target 3D video window;

converting the window feature into a two-dimensional (2D) tensor;

determining a set of query vectors, a first set of key vectors, and a first set of value vectors based on the 2D tensor;

concatenating the first set of key vectors with a second set of key vectors to obtain an updated set of key vectors, and concatenating the first set of value vectors with a second set of value vectors to obtain an updated set of value vectors, wherein the second set of key vectors and the second set of value vectors are determined based on a text associated with the input video; and determining the video attention based on the set of query vectors, the updated set of key vectors, and the updated set of value vectors.

16. The non-transitory computer-readable storage medium of claim 15, wherein the predetermined window size is independent from a size of the input video.

* * * * *